United States Patent
Kiesewetter et al.

(10) Patent No.: US 11,554,862 B2
(45) Date of Patent: Jan. 17, 2023

(54) VERTICAL TAKE-OFF AND LANDING MULTIROTOR AIRCRAFT WITH AT LEAST EIGHT THRUST PRODUCING UNITS

(71) Applicant: AIRBUS HELICOPTERS DEUTSCHLAND GMBH, Donauworth (DE)

(72) Inventors: Uwe Kiesewetter, Rain am lech (DE); Christian Reichensperger, Asbach-Baeumenheim (DE); Lukasz Paluszek, Augsburg (DE); Klaus Kicker, Hilgertshausen-Tandern (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 505 days.

(21) Appl. No.: 16/655,541

(22) Filed: Oct. 17, 2019

(65) Prior Publication Data

US 2020/0164972 A1 May 28, 2020

(30) Foreign Application Priority Data

Nov. 26, 2018 (EP) ..................... 18400033

(51) Int. Cl.
*B64C 27/28* (2006.01)
*B64C 27/20* (2006.01)
*B64C 29/00* (2006.01)

(52) U.S. Cl.
CPC .............. *B64C 27/28* (2013.01); *B64C 27/20* (2013.01); *B64C 29/0033* (2013.01)

(58) Field of Classification Search
CPC .. B64C 29/0033; B64C 29/0025; B64C 27/28
See application file for complete search history.

(56) References Cited

U.S. PATENT DOCUMENTS

| 3,262,657 A | 7/1966 | Anker-Holth |
| 6,568,630 B2 | 5/2003 | Yoeli |
| (Continued) | | |

FOREIGN PATENT DOCUMENTS

| CN | 201306711 A | 9/2009 |
| CN | 202728571 A | 2/2013 |
| (Continued) | | |

OTHER PUBLICATIONS

European Search Report for European Application No. EP 18400033. 9, Completed by the European Patent Office, dated May 21, 2019, 5 pages.

*Primary Examiner* — Richard Green
*Assistant Examiner* — Arfan Y. Sinaki
(74) *Attorney, Agent, or Firm* — Brooks Kushman P.C.

(57) ABSTRACT

A vertical take-off and landing multirotor aircraft with an airframe and at least eight thrust producing units, each one of the at least eight thrust producing units being provided for producing thrust in an associated predetermined thrust direction, wherein at least four thrust producing units of the at least eight trust producing units form a first thrust producing units sub-assembly, and at least four other thrust producing units of the at least eight thrust producing units form a second thrust producing units sub-assembly, the first thrust producing units sub-assembly being operable independent of the second thrust producing units sub-assembly.

15 Claims, 10 Drawing Sheets

(56) References Cited

U.S. PATENT DOCUMENTS

| | | | |
|---|---|---|---|
| 6,659,394 B1 | 12/2003 | Shenk | |
| 7,857,253 B2 | 12/2010 | Yoeli | |
| 7,946,528 B2 | 5/2011 | Yoeli | |
| D678,169 S | 3/2013 | Kennelly et al. | |
| 8,393,564 B2 | 3/2013 | Kroo | |
| 8,733,690 B2 | 5/2014 | Bevirt et al. | |
| 10,131,426 B2 | 11/2018 | Judas et al. | |
| 10,676,176 B1* | 6/2020 | Piedmonte | B64C 29/0025 |
| 2003/0062443 A1* | 4/2003 | Wagner | B64C 29/0025 244/12.3 |
| 2007/0034738 A1 | 2/2007 | Sanders, Jr. et al. | |
| 2013/0099065 A1 | 4/2013 | Stuhlberger | |
| 2013/0118856 A1 | 5/2013 | Long | |
| 2015/0127209 A1 | 5/2015 | Al-Garni et al. | |
| 2015/0314865 A1 | 11/2015 | Bermond et al. | |
| 2016/0236775 A1* | 8/2016 | Eshkenazy | B64C 29/0025 |
| 2017/0369162 A1 | 12/2017 | Alzahrani | |
| 2018/0162525 A1* | 6/2018 | St. Clair | B64C 29/0025 |
| 2019/0340937 A1* | 11/2019 | Villa | B64C 29/0016 |
| 2022/0009626 A1* | 1/2022 | Baharav | B64C 39/04 |

FOREIGN PATENT DOCUMENTS

| | | | | |
|---|---|---|---|---|
| CN | 104176250 A | 12/2014 | | |
| CN | 105151292 A | 12/2015 | | |
| CN | 105270620 A | 1/2016 | | |
| CN | 105346719 A | 2/2016 | | |
| CN | 205098474 A | 3/2016 | | |
| CN | 205707349 A | 11/2016 | | |
| CN | 206012959 A | 3/2017 | | |
| CN | 206218213 U | 6/2017 | | |
| CN | 107539472 A | 1/2018 | | |
| CN | 107600405 A | 1/2018 | | |
| CN | 206427269 A | 8/2018 | | |
| DE | 102005022706 A1 | 11/2006 | | |
| DE | 102013108207 A1 | 2/2015 | | |
| EP | 2551190 A1 | 1/2013 | | |
| EP | 2551193 A1 | 1/2013 | | |
| EP | 2551198 A1 | 1/2013 | | |
| EP | 2571762 B1 | 3/2013 | | |
| EP | 2985220 A1 | 2/2016 | | |
| EP | 2234883 B1 | 8/2017 | | |
| ES | 2327987 A1 | * | 11/2009 | B64C 29/0083 |
| GB | 905911 A | 9/1962 | | |
| GB | 2555439 A | 5/2018 | | |
| KR | 20090101413 A | 9/2009 | | |
| KR | 101451646 B1 | 10/2014 | | |
| WO | 2013126117 A1 | 8/2013 | | |
| WO | 2015028627 A1 | 3/2015 | | |
| WO | 2015143093 A1 | 9/2015 | | |
| WO | 2016004852 A1 | 1/2016 | | |
| WO | 2017021918 A1 | 2/2017 | | |
| WO | 2017155348 A1 | 9/2017 | | |
| WO | 2018078388 A1 | 5/2018 | | |

* cited by examiner

VERTICAL TAKE-OFF AND LANDING MULTIROTOR AIRCRAFT WITH AT LEAST EIGHT THRUST PRODUCING UNITS

CROSS-REFERENCE TO RELATED APPLICATIONS

This application claims priority to European patent application No. EP 18400033.9 filed on Nov. 26, 2018, the disclosure of which is incorporated in its entirety by reference herein.

BACKGROUND OF THE INVENTION

(1) Field of the Invention

The invention is related to a vertical take-off and landing (VTOL) multirotor aircraft with an airframe and at least eight thrust producing units, each one of the at least eight thrust producing units being provided for producing thrust in an associated predetermined thrust direction.

(2) Description of Related Art

Various conventional VTOL multirotor aircrafts are known, e. g. from the documents EP 2 551 190 A1, EP 2 551 193 A1, EP 2 551 198 A1, EP 2 234 883 A1, EP 2 571 762 A1, EP 2 985 220 A1, WO 2015/028627 A1, WO 2016/004852 A1, WO 2017/021918 A1, WO 2017/155348 A1, WO 2018/078388 A1, U.S. Pat. Nos. 3,262,657, 7,857,253 B2, 7,946,528 B2, US 2007/0034738 A1, US 2017/0369162 A1, GB 905 911, CN 104176250 A, CN 105151292 A, CN 105270620 A, CN 105346719 A, CN 107539472 A, CN 107600405 A, CN 201306711 U, CN 202728571 U, CN 205098474 U, CN 205707349 U, CN 206012959 U, CN 206427269 U, and KR 20090101413 A. Other VTOL multirotor aircrafts are also known from the state of the art, such as e. g. the Boeing CH-47 tandem rotor helicopter, the Bell XV-3 tilt rotor aircraft, the Bell XV-22 quad tilt with ducted rotors, as well as so-called drones and, more particularly, so-called quad drones, such as e. g. described in the documents US 2015/0127209 A1, DE 10 2005 022 706 A1 and KR 101 451 646 B1. Furthermore, VTOL multirotor aircraft studies, prototypes and fictions also exist, such as e. g. the crossover-mobility vehicle Pop.Up Next from Airbus, Italdesign and Audi, the autonomous aerial vehicle Ehang 184 from Bejing Yi-Hang Creation Science & Technology Co. Ltd., the skyflyer SF MK II from Skyflyer Technology GmbH, the Quadcruiser from Airbus Group, and the multicopter shown in the Avatar movie. The documents US2016236775, U.S. Pat. No. 6,659,394, US2003062443 and GB2555439 are also worth to be cited.

Each one of these VTOL multirotor aircrafts is equipped with less than eight thrust producing units that are provided for producing thrust in a predetermined thrust direction during operation of the multirotor aircraft. However, studies, prototypes and fictions of VTOL multirotor aircrafts that are equipped with eight or more thrust producing units also exist, such as e. g. the multicopter Volocopter 2X from e-Volo GmbH, the VTOL aircraft S2 from Joby Aviation Inc., the Aurora eVTOL and the LightningStrike (XV-24A) from Aurora Flight Sciences, the EAC Whisper from Electric Aircraft Concept, the DreamMaker from Embraer S. A., the Hi-Lite Lynx-us from Hi-Lite Aircraft LLC, the Formula from Hoversurf Inc., the Cora from Kitty Hawk Corp., the Napoleon Aero VTOL from Napoleon Aero, the X01 from Electric Visionary Aircrafts, the Venturi from HopFlyt, the Optionally Piloted Personal Air Vehicle from KARI, the Lilium Jet from Lilium GmbH, the eOpter from Neoptera Ltd., the BlackFly from Opener Inc., the PAT200 from VerdeGo Aero, the Vertiia from AMSL Aero Pty Ltd., the AAV from Vimana Global Inc., the EOPA from Zenith Altitude Inc., and the eVTOL Vahana from Airbus A3. Still other VTOL multirotor aircrafts with eight or more thrust producing units are described in the documents WO 2013/126117 A1, WO 2015/143093 A2, DE 10 2013 108 207 A1, U.S. Pat. No. 6,568,630 B2, US D678 169 S, U.S. Pat. No. 8,393,564 B2, U.S. Pat. No. 8,733,690 B2, US 2013/0118856 A1, and CN 206218213 U.

In general, each thrust producing unit includes one or more rotors or propellers and is, usually, designed for specific flight conditions. By way of example, a thrust producing unit that is designed as an airplane propeller operates at its optimum in cruise conditions, whereas a thrust producing unit that is designed as propeller of a compound helicopter is essentially adapted for hover or forward flight conditions, while a thrust producing unit that implements e. g. a so-called Fenestron® tail rotor is particularly designed for hover conditions.

However, in any case the respective thrust producing unit is optimized for operation in axial air flow conditions, i. e. in an air flow direction that is oriented at least approximately along a rotor axis resp. rotation axis of the given one or more rotors or propellers and, therefore, referred to as an axial air flow direction. If, however, the respective thrust producing unit is operated in transversal air flow conditions, i. e. in an air flow direction that is oriented transverse to the rotor axis of the given one or more rotors or propellers and, therefore, referred to as a non-axial air flow direction, a respective efficiency of the thrust producing unit usually decreases considerably. As a consequence, mainly three different types of VTOL multirotor aircrafts are currently developed.

A first VTOL multirotor aircraft type exhibits a design that may be referred to as a "conventional design". According to this conventional design, the first VTOL multirotor aircraft type is usually wingless and only equipped with thrust producing units which are rigidly attached to a respective airframe and essentially adapted for hover, but which are nevertheless also used to provide thrust in cruise operation. An example for this first VTOL multirotor aircraft type is the Volocopter 2X from e-Volo GmbH.

Using the rigidly attached thrust producing units of a VTOL multirotor aircraft having a conventional design for generating thrust in cruise operation usually implies inclining the complete airframe to which the thrust producing units are rigidly attached, i. e. inclining the entire VTOL multirotor aircraft. However, in particular for recently appearing VTOL multirotor aircraft concepts related to fast flying and/or passenger carrying VTOL multirotor aircrafts, such an inclining of the entire VTOL multirotor aircraft implies multiple technical problems and disadvantages, such as e. g. a comparatively great power consumption, disproportional performance limitations, limited passenger comfort, and so on.

A second VTOL multirotor aircraft type exhibits a design that may be referred to as a "convertible design". According to this convertible design, the second VTOL multirotor aircraft type is equipped with tiltable thrust producing units which are tiltable between a first position, wherein they only produce thrust for hover, and a second position, wherein they only produce thrust for cruise operation. The second VTOL multirotor aircraft type is usually implemented in fixed-wing or tiltable-wings layout. An example for this second VTOL multirotor aircraft type in tiltable-wings layout is the eVTOL Vahana from Airbus A3.

However, the provision of tiltable thrust producing units results in high system complexity and system weight due to a need of controlling and surveillance of required active actuation means. Already the provision of such required active actuation means usually significantly increases an underlying system complexity and weight, so that respective maintenance costs of such VTOL multirotor aircrafts in convertible design are generally very high. Furthermore, VTOL multirotor aircrafts in convertible design are usually designed for a specific flight condition, i. e. either for hover or for cruise operation, but they are never optimized for intermediate flight states. In fact, they transform more or less linearly from hover to cruise operation by changing from a pure "rotorcraft operation" to a pure "airplane operation".

A major drawback of VTOL multirotor aircrafts in convertible design consists in a safety critical rotation of the tiltable thrust producing units during the transformation from hover to cruise operation and vice versa. In fact, during the transformation the tiltable thrust producing units produce a significant amount of load, i. e. pure thrust-related loads combined with multidirectional loads and moments. Another drawback emanates from the appearance of interferences between front and rear thrust producing units, which significantly reduces the efficiency of VTOL multirotor aircrafts in convertible design.

A third VTOL multirotor aircraft type exhibits a design that may be referred to as a "compound design". According to this compound design, the third VTOL multirotor aircraft type is equipped with rigidly mounted thrust producing units which are essentially adapted for hover, and with rigidly mounted thrust producing units which are provided to produce thrust for cruise operation. The third VTOL multirotor aircraft type is usually implemented in wingless or fixed-wing layout. An example for this third VTOL multirotor aircraft type in fixed-wing layout is the Cora from Kitty Hawk Corp.

However, the rigidly mounted thrust producing units which are provided to produce thrust for cruise operation in a VTOL multirotor aircraft in compound design are in Off-mode in hover and, thus, do not generate any lift force in hover. Accordingly, these rigidly mounted thrust producing units which are provided to produce thrust for cruise operation merely generate a huge weight penalty to the VTOL multirotor aircraft in compound design in hover.

BRIEF SUMMARY OF THE INVENTION

It is, therefore, an object of the present invention to provide a new VTOL multirotor aircraft that exhibits at least an improved efficiency both in hover and cruise operation.

This object is solved by a VTOL multirotor aircraft comprising the features of claim 1. More specifically, according to the present invention a VTOL multirotor aircraft with an airframe and at least eight thrust producing units is provided, each one of the at least eight thrust producing units being provided for producing thrust in an associated predetermined thrust direction. At least four thrust producing units of the at least eight thrust producing units form a first thrust producing units sub-assembly and at least four other thrust producing units of the at least eight thrust producing units form a second thrust producing units sub-assembly, the first thrust producing units sub-assembly being operable independent of the second thrust producing units sub-assembly. Furthermore, at least two thrust producing units of the first thrust producing units sub-assembly and at least two thrust producing units of the second thrust producing units sub-assembly are arranged in an intersection zone of the first and second thrust producing units sub-assemblies and are non-tiltably connected to the airframe for generating lift at least during vertical taking-off and landing. Furthermore, at least two thrust producing units of the second thrust producing units sub-assembly are inclined by a predetermined inclination angle, which is illustratively referred to as the angle (3, with respect to a longitudinal direction of the aircraft and are non-tiltably connected to the airframe for generating forward thrust at least during low-speed cruise operation. Moreover, at least two thrust producing units of the first thrust producing units sub-assembly are tiltably connected to the airframe for generating additional forward thrust at least during high-speed cruise operation.

Advantageously, the inventive VTOL multirotor aircraft exhibits an improved efficiency and functioning both in hover and cruise operation, i. e. in forward flight. Furthermore, an overall power consumption of the inventive VTOL multirotor aircraft is advantageously reduced compared to conventional VTOL multirotor aircrafts, such as described above.

More specifically, the inventive VTOL multirotor aircraft has an improved configuration that is based on a combination of the above-described usual design types, i. e. the conventional design, the convertible design and the compound design. In other words, different types of aircrafts are combined in a new way to ensure outstanding flight safety, efficiency in cruise operation, and adaptability to transform from one configuration to another configuration in-flight within a wide regime of flight velocities.

More particularly, the inventive VTOL multirotor aircraft advantageously combines at least two "sub-multicopters", each being provided with at least four associated thrust producing units, wherein the at least two sub-multicopters overlap each other in the intersection zone, and wherein at least one of a wing, a blown-wing, one or more partial shroudings, or full shroudings may be located in the intersection zone. However, still further evolved configurations are also contemplated, wherein e. g. additional thrust producing units, such as e. g. pusher propellers that are dedicated for forward flight, may also be arranged in the intersection zone. Nevertheless, in any case the center of gravity and the center of lift of the inventive VTOL multirotor aircraft must be located in the intersection zone.

Preferably, at least one of the sub-multicopters takes care of low-speed cruise operation and is optimized for hover, while the other sub-multicopter takes care of intermediate-speed cruise operation and is optimized for cruise operation and provided with the at least two rigidly (pre-) inclined thrust producing units. Thus, in operation of the inventive VTOL multirotor aircraft during increasing of a respective flight speed of the inventive VTOL multirotor aircraft in cruise operation, an underlying balance of thrust may be shifted from one sub-multicopter to another sub-multicopter by respecting a particular respective flight situation.

Advantageously, all sub-multicopters, but at least the two sub-multicopters described above, are able to work in a completely isolated manner or simultaneously together. Preferably, an in-flight transformation from hover configuration to forward flight configuration of the at least two sub-multicopters can at least be performed at flight speeds from approximately 30% to 70% of a predefined cruise speed of the inventive VTOL multirotor aircraft. This allows to gain aerodynamic efficiency by means of a transformation of the inventive VTOL multirotor aircraft to a kind of airplane, to avoid negative interactional effects, as e. g. a respective rotational speed of associated rotor assemblies of respective front thrust producing units can be reduced by increasing a current flight speed, and to increase flight safety due to operation of at least one thrust producing unit in an uncritical situation resp. failure tolerant flight mode, as e. g. respective rotor assemblies are in Off-mode or close to Off during the in-flight transformation. Preferably, in the region of a respective in-flight transformation speed, at least one sub-multicopter, preferably the one that is optimized for hover, can be switched Off, and transformed, e. g. by inclining at least one thrust producing unit, into an airplane mode.

Advantageously, the inventive VTOL multirotor aircraft is able to deal with different types of propulsion methods, e. g. fully electrical, partly electrical, gas turbine driven, conventionally combustion engine operated, etc. Accordingly, different kinds of engines can be realized in a unique combination. In particular, according to one aspect, at least one thrust producing unit of each sub-multicopter is operated by an alternative propulsion method compared to the rest. Furthermore, respective rotor assemblies of the thrust producing units may either be driven by direct-drives or cross-connected by pairs.

Moreover, the inventive VTOL multirotor aircraft is preferably arranged to allow for an improved yaw stabilization. This can be done by respectively actively controlling yaw and/or e. g. using a symmetrical fenestron.

According to one aspect, low-speed cruise operation comprises operation at a velocity of 0.3*Vh to less than 0.7*Vh and high-speed cruise operation comprises operation at a velocity of at least 0.7*Vh. Vh is a predefined cruise speed of the aircraft and, as such, preferably application-specific.

The at least two thrust producing units of the first thrust producing units sub-assembly which are tiltably connected to the airframe for generating additional forward thrust at least during high-speed cruise operation may be tilted during low-speed cruise operation.

Preferably, the at least two thrust producing units of the first thrust producing units sub-assembly which are tiltably connected to the airframe for generating additional forward thrust at least during high-speed cruise operation are tiltable with respect to a longitudinal direction of the aircraft by an associated inclination angle in a range from −90° to 0°, the associated inclination angle being illustratively referred to as the angle α.

The intersection zone may be provided with at least one of a wing, a blown-wing, one or more partial shroudings, or full shroudings.

Preferably, each partial shrouding and/or each full shrouding exhibits an aerodynamically improved design that leads to a significantly reduced aerodynamic drag in transversal air flow conditions, e. g. in forward flight of the inventive VTOL multirotor aircraft. This significantly reduced aerodynamic drag results at least partially from a preferred design of each shrouding itself, in particular from an underlying undulated geometry of the air inlet region in circumferential direction of the cylindrical air duct.

More specifically, a respective partial or full shrouding of a given thrust producing unit and all associated elements are preferably axially non-symmetric, i. e. non-symmetric over the azimuth ψ of the shrouding. In other words, the respective partial or full shrouding is designed on the basis of a variable factor with respect to all associated elements, i. e.:

Height vs. Azimuth ψ,
Air inlet region radius vs. Azimuth ψ,
Air outlet region radius vs. Azimuth ψ, and/or
Arrangement of additional lifting surfaces vs. Azimuth ψ.

In particular, a variable height of the respective partial or full shrouding enables significant advantages in the trade-off between vertical take-off and hovering, wherein an underlying efficiency increases with an increase of the height of the respective partial or full shrouding, and forward flight, wherein an underlying drag decreases with a decrease of the height of the respective partial or full shrouding, as this reduces a respective drag area of the respective partial or full shrouding.

Advantageously, the respective partial or full shrouding may be used as an additional lifting device during hover and forward flight cases of the inventive VTOL multirotor aircraft and, thus, beneficially allows reduction of a respective power consumption of the inventive VTOL multirotor aircraft. Furthermore, the respective partial or full shrouding may provide for a shielding effect with respect to a rotor assembly that is accommodated therein and, thus, advantageously allows to reduce a respective rotor noise footprint on ground.

Preferably, by providing at least each one of the thrust producing units of the inventive VTOL multirotor aircraft that are arranged in the intersection zone with the at least two rotor assemblies that define different rotor planes, the rotor assemblies can be positioned above each other and rotated in a counter rotating manner, leading to thrust producing units that provide for an increased safety level and that allow reduction of the overall dimensions of the inventive VTOL multirotor aircraft, resulting in a comparatively small aircraft, since the two or more rotor planes can be combined respectively in a single thrust producing unit.

Preferably, the respective partial or full shrouding accommodates at least one associated electrical engine and beneficially creates additional lift. This is important in order to increase an underlying efficiency of the inventive VTOL multirotor aircraft and its electrical engines on a global level.

More specifically, preferably each thrust producing unit comprises a load carrying framework that comprises a carrier beam which is used for mounting of the at least one electrical engine. This carrier beam advantageously transfers loads from the at least one electrical engine to associated forward and aft beams of the respective thrust producing unit and is stiffening the partial or full shrouding in longitudinal direction of the airframe of the VTOL multirotor aircraft in order to prevent ovalisation in operation by supporting the respective thrust producing unit at its highest loaded locations. Furthermore, due to its longitudinal orientation in parallel to a longitudinal extension of the airframe of the inventive VTOL multirotor aircraft, the carrier beam merely contributes in a completely neglectable manner to an overall aerodynamic drag of the inventive VTOL multirotor aircraft. In particular, as it is not arranged radially with respect to rotor blades of a given rotor assembly, it exhibits significant advantages concerning its contribution to noise emission.

Furthermore, the forward and aft beams that are connected to the carrier beam, preferably attach the partial or full shrouding of the respective thrust producing unit to the airframe of the inventive VTOL multirotor aircraft. The forward and aft beams may be provided with continuous flanges in order to be as stiff as possible with respect to bending loads. Furthermore, if torsional loads must be taken into consideration and are important, closed profiles can be used for a respective support structure that is defined by the forward and aft beams, respectively their continuous flanges.

Preferably, the forward and aft beams are located outside of a cylindrical air duct defined by the respective thrust producing unit. Thus, they can advantageously be shaped aerodynamically by any means without detrimental effect on the downwash of the respective thrust producing unit. Preferably, the forward and aft beams are integrated into the partial or full shrouding of the respective thrust producing unit.

Furthermore, use of a partial or full shrouding advantageously allows for integration of a respective electrical engine and cooling into the partial or full shrouding. Moreover, due to the longitudinally arranged carrier beam inside of the cylindrical air duct, the respective electrical engine can be integrated eccentrically, i. e. sideward of the carrier beam. This allows the carrier beam to work as a continuous bending beam without any tapering and cross section variances. This has a significant advantage with respect to stiffness, stress and fatigue. Furthermore, the carrier beam offers a large area which is also oriented along a transversal air flow direction and, thus, a large cooling area for the electrical engine is provided and available, which is, however, not contributing to the overall aerodynamic drag of the inventive VTOL multirotor aircraft.

Preferably, the carrier beam is arranged eccentrically inside of the cylindrical air duct and at least essentially coplanar to a cross section of the cylindrical air duct. The at least one electrical engine may be eccentrically mounted to the carrier beam. The carrier beam is preferentially a cantilever. The carrier beam may be mounted at a trailing edge region of the cylindrical air duct to the partial or full shrouding.

According to still a further aspect, the carrier beam is bar-shaped and extends from the leading edge region to the trailing edge region of the partial or full shrouding. Preferably, the partial or full shrouding comprises a forward beam and an aft beam which both connect the carrier beam to the airframe, the forward beam and the aft beam being arranged outside of the cylindrical air duct. The forward beam may comprise a forward flange and the aft beam may comprise an aft flange, the forward flange and the aft flange being attached to the airframe. The forward beam and the forward flange may be integrally formed, and the aft beam and the aft flange may likewise be integrally formed. Preferably, the forward flange and the aft flange are integrally formed.

According to one aspect, the shrouding is provided with an additional lifting surface at the leading edge region of the cylindrical air duct. More specifically, the air inlet region may exhibit in circumferential direction of the cylindrical air duct an undulated geometry. The cylindrical air duct comprises in circumferential direction a leading edge region and a diametrically opposed trailing edge region, a board side lateral region and a diametrically opposed star board side lateral region, wherein the board side lateral region and the star board side lateral region are respectively arranged in the circumferential direction of the cylindrical air duct between the leading edge region and the trailing edge region. A height at the leading edge region is preferably smaller than a height at the board side lateral region and/or the star board side lateral region.

The cylindrical air duct may exhibit a height defined between the air outlet region and the air inlet region in axial direction of the cylindrical air duct that varies in circumferential direction of the cylindrical air duct. The height that varies in the circumferential direction of the cylindrical air duct defines the undulated geometry of the air inlet region.

The height at the trailing edge region is preferably smaller than a height at the board side lateral region and/or the star board side lateral region. Preferentially, the height at the trailing edge region is smaller than the height at the leading edge region.

Moreover, the partial or full shrouding can be optimized with respect to aerodynamics and performance in that it can be designed in order to provide additional lift. In particular, a leading edge region of the shrouding can be designed for providing such additional lift.

According to one aspect, the intersection zone of the inventive VTOL multirotor aircraft comprises a wing that accommodates at least partly each one of the at least two thrust producing units of the first thrust producing units sub-assembly which are arranged in the intersection zone and/or each one of the at least two thrust producing units of the second thrust producing units sub-assembly which are arranged in the intersection zone.

A partial shrouding may be provided for each one of the at least two thrust producing units of the first thrust producing units sub-assembly which are accommodated in the wing and/or each one of the at least two thrust producing units of the second thrust producing units sub-assembly which are accommodated in the wing. This partial shrouding may be configured as described above.

Provision of a partial shrouding advantageously allows to reduce an overall drag of the shrouding as such. Accordingly, the partial shrouding enables minimization of its inherent penalties in cruise operation resp. forward flight, while still allowing to improve associated characteristics of a respective thrust producing unit in hover.

Preferably, at least the at least two thrust producing units of the first thrust producing units sub-assembly which are tiltably connected to the airframe for generating additional forward thrust at least during high-speed cruise operation are arranged in the longitudinal direction of the aircraft upstream of the wing.

Preferably, at least 25% of the at least eight thrust producing units are arranged in the longitudinal direction of the aircraft upstream of the wing.

The predetermined inclination angle $\beta$ may be in a range from $-25°$ to $-45°$.

The at least two thrust producing units of the second thrust producing units sub-assembly which are inclined by the predetermined inclination angle $\beta$ with respect to the longitudinal direction of the aircraft and which are non-tiltably connected to the airframe for generating forward thrust at least during low-speed cruise operation may be mounted to a rear stabilizer.

At least two additional thrust producing units may be provided, the at least two additional thrust producing units being inclined by at least approximately $-90°$ with respect to a longitudinal direction of the aircraft and being non-tiltably connected to the airframe for generating additional forward thrust at least during high-speed cruise operation.

Preferably, the first thrust producing units sub-assembly is dedicated to control of vertical take-off and landing, and the second thrust producing units sub-assembly is dedicated to control of low-speed cruise operation.

Preferably, at least 50% of the at least eight thrust producing units are electrically driven.

According to one aspect, the airframe is adapted for transportation of passengers.

Advantageously, the inventive VTOL multirotor aircraft is not only designed for transportation of passengers, but is, in particular, suitable and adapted for being certificated for operation within urban areas. It is preferably easy to fly, has multiple redundancies, meets the safety demands of the authorities, is cost efficient in design and only creates comparatively low noise. Preferably, the inventive VTOL multirotor aircraft has comparatively small rotor diameters with light weight design and is nevertheless adapted for fulfilment of an emergency landing.

Furthermore, the inventive VTOL multirotor aircraft is preferably capable of hovering and comprises a distributed propulsion system. It is further preferably designed with autorotation capability, which is necessary amongst other requirements in order to meet authority regulations, such as e. g. FAR and EASA regulations, regarding safety failure modes that amount up to approximately 1*10-7 failures per flight hour for the entire multirotor aircraft. In the aeronautical sector, these safety levels are typically defined by the so-called Design Assurance Levels (DAL) A to D.

Preferably, the inventive VTOL multirotor aircraft fulfils the authorities' regulation safety level needed to transport passengers. This is preferentially achieved by a combination and correlation of:
- at least two individual rotor assemblies per thrust producing unit,
- a redundant, segregated battery layout,
- a redundant power supply and harness layout,
- a physical separation and segregation of an underlying power management,
- redundant, segregated electrical engines, and
- pitch control and/or RPM control of the rotor assemblies.

Advantageously, the inventive VTOL multirotor aircraft increases respective flight capabilities and economy of VTOL multirotor aircrafts significantly. Nevertheless, a respective pitch attitude of the inventive VTOL multirotor aircraft can be kept within an acceptable range of approximately ±10 deg, compared to ±45 deg of conventional VTOL multirotor aircrafts, within relatively wide cruise speed corridors of e. g. 50 km/h to 150 km/h in forward flight. Furthermore, an in-flight transformation of the inventive VTOL multirotor aircraft, either on ground for rolling take-offs or during forward flight at 50 km/h to 150 km/h, ensures increased flight safety compared to any other transformative aircraft, since respectively affected thrust producing units are not required to lift the inventive VTOL multirotor aircraft in a flight state close to the in-flight transformation. Moreover, the inventive arrangement of the thrust producing units allows a reduction of negative interactional effects between front and rear parts of the inventive VTOL multirotor aircraft significantly.

It should be noted that although the inventive VTOL multirotor aircraft is described above with reference to a multirotor structure with multiple rotor assemblies, it could likewise be implemented as a multipropeller structure with multiple propeller assemblies or as a multipropeller and -rotor structure. More specifically, while rotors are generally fully articulated, propellers are generally not articulated at all. However, both can be used for generating thrust and, thus, for implementing the thrust producing units of the VTOL multirotor aircraft according to the present invention. Consequently, any reference to rotors or rotor structures in the present description should likewise be understood as a reference to propellers and propeller structures, so that the inventive VTOL multirotor aircraft can likewise be implemented as a multipropeller and/or multipropeller and -rotor aircraft.

In other words, the present invention principally relates to a multiple thrust configuration with rotors/propellers that define rotor/propeller planes, which can be selected to be positioned atop of each other individually, a partial or full shrouding for enclosing any rotating parts of at most one of the rotors/propellers, preferably at least one electrical engine which drives each rotor/propeller, wherein each engine can be segregated in order to increase a provided safety level, and wherein a logic connection preferably exists between battery and electrical engines, the logic connection preferentially comprising a redundant design increasing the safety level in case of failure, and wherein preferably a battery redundancy layout with an appropriate safety level in case of failure is provided.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
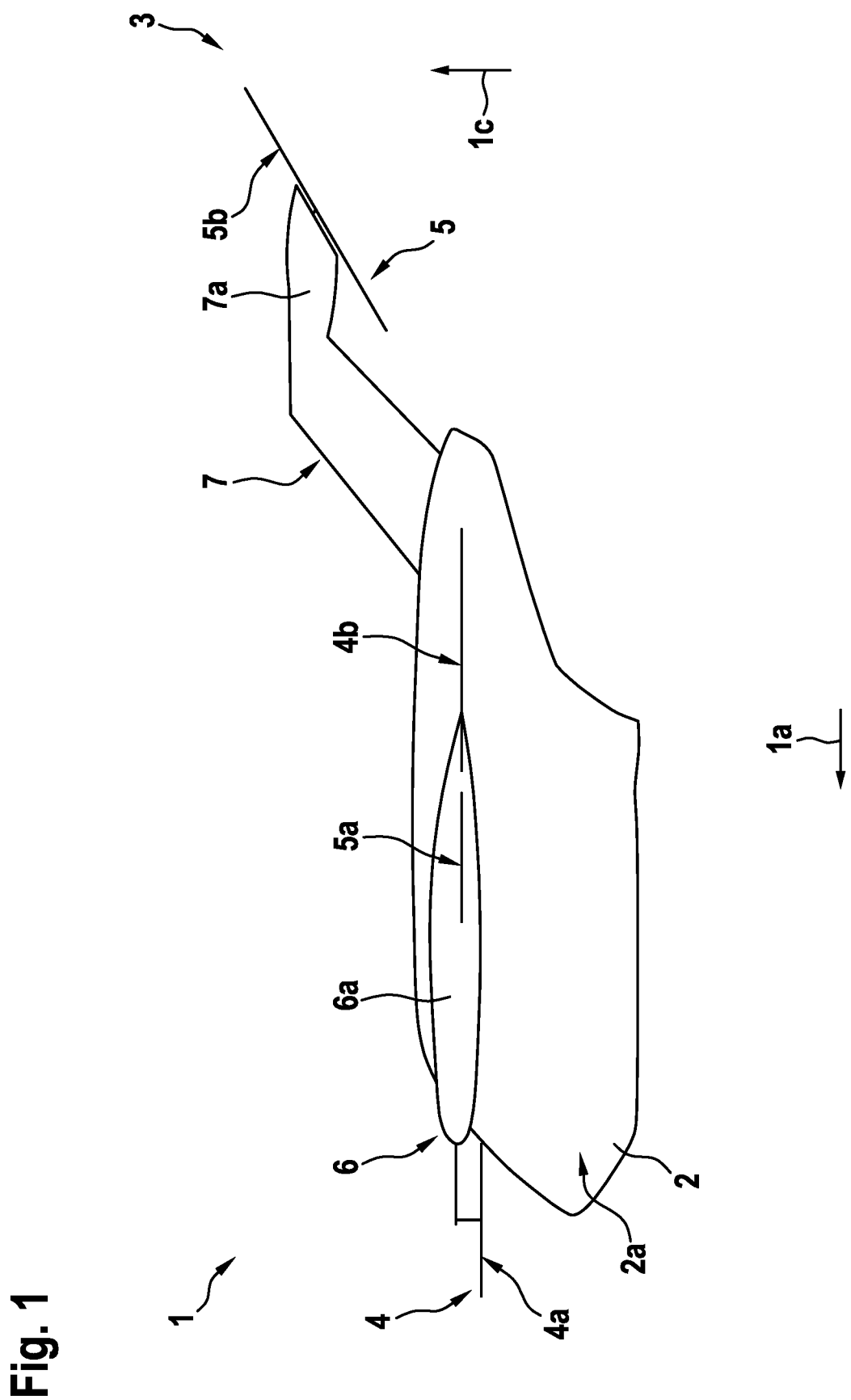
FIG. 1 shows a side view of a VTOL multirotor aircraft with a plurality of thrust producing units and a wing according to one aspect of the present invention, during vertical taking-off and landing.

FIG. 1 shows an exemplary VTOL multirotor aircraft 1 with an aircraft airframe 2. The aircraft airframe 2 defines a supporting structure that is also referred to hereinafter as the "fuselage" of the VTOL multirotor aircraft 1.

The fuselage 2 has an extension in longitudinal direction, which is illustratively represented by an arrow 1a that also exemplarily indicates a forward flight direction of the VTOL multirotor aircraft 1, an extension in lateral direction (1b in FIG. 2, FIG. 3, FIG. 5, FIG. 6, FIG. 9 and FIG. 10), and an extension in vertical direction, which is illustratively represented by an arrow 1c that also exemplarily indicates a vertical take-off direction. The fuselage 2 may be connected to any suitable undercarriage, such as e. g. a skid- or wheel-type landing gear.

Preferably, the fuselage 2 defines an internal volume 2a that is at least adapted for transportation of passengers, so that the VTOL multirotor aircraft 1 as a whole is adapted for transportation of passengers. The internal volume 2a is preferably further or alternatively adapted for accommodating operational and electrical equipment, such as e. g. an energy storage system that is required for operation of the VTOL multirotor aircraft 1.

It should be noted that exemplary configurations of the internal volume 2a that are suitable for transportation of passengers, but also or alternatively for accommodation of operational and electrical equipment, are readily available to the person skilled in the art and generally implemented to comply e. g. with applicable authority regulations and certification requirements regarding passenger transportation. Thus, as these configurations of the internal volume 2a as such are not part of the present invention, they are not described in detail for brevity and conciseness.

Illustratively, the VTOL multirotor aircraft 1 comprises a plurality of thrust producing units 3. Preferably, each one of the plurality of thrust producing units 3 is provided for producing thrust in an associated predetermined thrust direction.

The plurality of thrust producing units 3 is preferably divided into a first thrust producing units sub-assembly 4 and a second thrust producing units sub-assembly 5. By way of example, the first thrust producing units sub-assembly 4 illustratively comprises thrust producing units 4a, 4b, and the second thrust producing units sub-assembly 5 illustratively comprises thrust producing units 5a, 5b. Configuration and structure of the first thrust producing units sub-assembly 4 and the second thrust producing units sub-assembly 5 are further explained below with reference to FIG. 2.

According to one aspect, the VTOL multirotor aircraft 1 comprises a wing 6. The wing 6 exemplarily comprises a star board side half wing 6a and a board side half wing (6b in FIG. 2, FIG. 3, FIG. 5, FIG. 6, FIG. 9 and FIG. 10).

Furthermore, the VTOL multirotor aircraft 1 preferably comprises a rear stabilizer 7. The rear stabilizer 7 preferentially comprises a support structure 7a, which is by way of example illustratively connected to the thrust producing unit 5b of the second thrust producing units sub-assembly 5.

Figure 2:
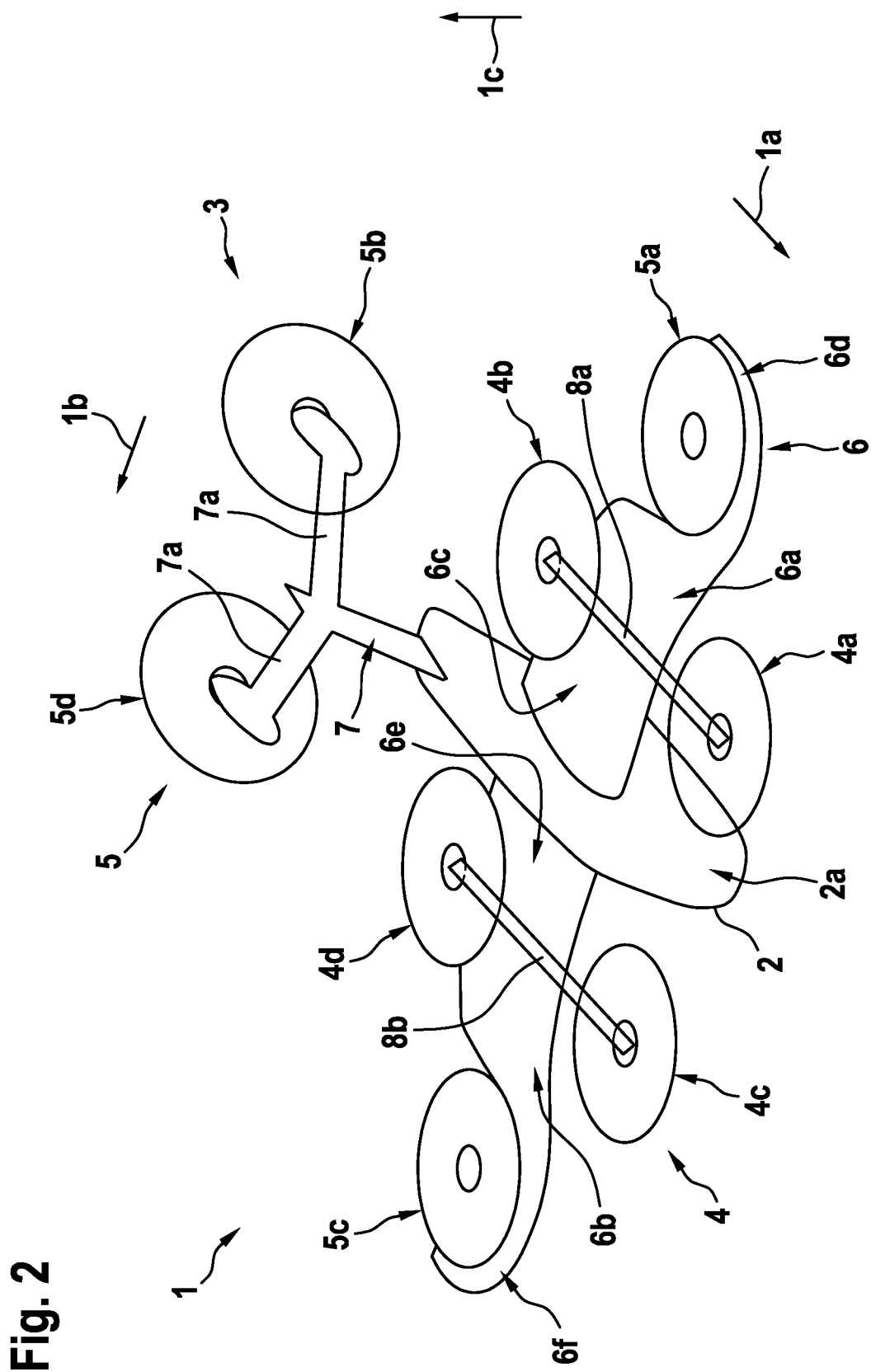
FIG. 2 shows a perspective view of the VTOL multirotor aircraft of FIG. 1, with the plurality of thrust producing units and the wing.

FIG. 2 shows the VTOL multirotor aircraft 1 of FIG. 1 with the fuselage 2 that extends in the longitudinal direction 1a, the vertical direction 1c, and a lateral direction that is illustratively represented by an arrow 1b. The VTOL multirotor aircraft 1 comprises the plurality of thrust producing units 3 of FIG. 1 with the first thrust producing units sub-assembly 4 and the second thrust producing units sub-assembly 5. Furthermore, the VTOL multirotor aircraft 1 comprises the wing 6 of FIG. 1 with the star board side half wing 6a and a board side half wing 6b, as well as the rear stabilizer 7 of FIG. 1.

By way of example, the plurality of thrust producing units 3 comprises eight thrust producing units, i. e. the thrust producing units 4a, 4b, 5a, 5b of FIG. 1, as well as thrust producing units 4c, 4d, 5c, 5d. Each one of these eight thrust producing units 4a, 4b, 4c, 4d, 5a, 5b, 5c, 5d is provided for producing thrust in an associated predetermined thrust direction. Preferably, at least 50% of the eight thrust producing units 4a, 4b, 4c, 4d, 5a, 5b, 5c, 5d is driven electrically.

The thrust producing units 4a, 4b, 4c, 4d illustratively form the first thrust producing units sub-assembly 4 and the thrust producing units 5a, 5b, 5c, 5d illustratively form the second thrust producing units sub-assembly 5. In other words, the first thrust producing units sub-assembly 4 exemplarily comprises four thrust producing units and the second thrust producing units sub-assembly 5 also exemplarily comprises four thrust producing units. Preferably, the first thrust producing units sub-assembly 4 is operable independent of the second thrust producing units sub-assembly 5.

According to one aspect, the thrust producing units 4a, 4b, 4c, 4d of the first thrust producing units sub-assembly 4 are driven electrically, while the thrust producing units 5a, 5b, 5c, 5d of the second thrust producing units sub-assembly 5 are driven with different power units, such as e. g. combustion and/or turbine engines. Alternatively, the thrust producing units 5a, 5b, 5c, 5d of the second thrust producing units sub-assembly 5 may be driven electrically, while the thrust producing units 4a, 4b, 4c, 4d of the first thrust producing units sub-assembly 4 are driven with different power units, such as e. g. combustion and/or turbine engines. Still alternatively, selected thrust producing units from the first and second thrust producing units sub-assemblies 4, 5 may be driven electrically, e. g. the thrust producing units 4b, 4d, 5a, 5c, while the remaining thrust producing units from the first and second thrust producing units sub-assemblies 4, 5, i. e. the thrust producing units 4a, 4c, 5b, 5d, are driven with different power units, such as e. g. combustion and/or turbine engines.

Preferably, the first thrust producing units sub-assembly 4 is dedicated to control of vertical taking-off and landing. The second thrust producing units sub-assembly 5 is preferably dedicated to control of low-speed cruise operation.

According to one aspect, the thrust producing units 5b, 5d of the second thrust producing units sub-assembly 5 are inclined by a predetermined inclination angle ((3 in FIG. 4) with respect to the longitudinal direction 1a of the VTOL multirotor aircraft 1. They are preferably non-tiltably connected to the fuselage 2 for generating forward thrust at least during low-speed cruise operation. More specifically, the thrust producing units 5b, 5d are exemplarily rigidly mounted to the support structure 7a of the rear stabilizer 7.

The thrust producing units 4a, 4c of the first thrust producing units sub-assembly 4 in turn are preferably tiltably connected to the fuselage 2 for generating additional forward thrust at least during high-speed cruise operation. However, it should be noted that tiltably connecting thrust producing units to the fuselage of a VTOL multirotor aircraft is well-known in the art and as such not the object of the present invention. Therefore, the tiltable connection of the thrust producing units 4a, 4c to the fuselage 2 is not described in more detail.

Preferably, high-speed cruise operation comprises operation at a velocity of at least 0.7*Vh, while low-speed operation comprises operation of the VTOL multirotor aircraft 1 at a velocity of 0.3*Vh to less than 0.7*Vh. Vh is a predefined cruise speed of the VTOL multirotor aircraft 1, which may be aircraft-resp. application-dependent.

Illustratively, the thrust producing units 4b, 4d of the first thrust producing units sub-assembly 4 and the thrust producing units 5a, 5c of the second thrust producing units sub-assembly 5 are connected to the wing 6. More specifically, the star board side half wing 6a preferably accommodates at least partly the thrust producing units 4b, 5a, while the board side half wing 6b preferably accommodates at least partly the thrust producing units 4d, 5c.

By way of example, the thrust producing unit 4b is arranged at an inboard section 6c of the star board side half wing 6a and the thrust producing unit 5a is arranged at an outboard section 6d of the star board side half wing 6a. Likewise, the thrust producing unit 4d is illustratively arranged at an inboard section 6e of the board side half wing 6b and the thrust producing unit 5c is illustratively arranged at an outboard section 6f of the board side half wing 6b.

Preferably, the thrust producing units 4a, 4c of the first thrust producing units sub-assembly 4, which are tiltably connected to the fuselage 2 for generating additional forward thrust at least during high-speed cruise operation, are arranged in the longitudinal direction 1a of the VTOL multirotor aircraft 1 upstream of the wing 6. More generally, preferably at least 25% of the eight thrust producing units 4a, 4b, 4c, 4d, 5a, 5b, 5c, 5d are arranged in the longitudinal direction 1a of the VTOL multirotor aircraft 1 upstream of the wing 6. In the illustrated example, only two of the eight thrust producing units are arranged in the longitudinal direction 1a upstream of the wing 6, i. e. exactly 25% of the eight thrust producing units 4a, 4b, 4c, 4d, 5a, 5b, 5c, 5d.

However, in order to avoid undesired parasitical interactions between all thrust producing units that are arranged in the longitudinal direction 1a of the VTOL multirotor aircraft 1 upstream of the wing 6, a respective number of thrust producing units that are arranged in the longitudinal direction 1a of the VTOL multirotor aircraft 1 upstream of the wing 6 is preferably restricted. Accordingly, advantageously not more than 40% of all thrust producing units, in the present example of the thrust producing units 4a, 4b, 4c, 4d, 5a, 5b, 5c, 5d, should be arranged in the longitudinal direction 1a of the VTOL multirotor aircraft 1 upstream of the wing 6.

According to one aspect, the thrust producing units 4a, 4b are interconnected by means of an associated interconnection beam 8a. Likewise, the thrust producing units 4c, 4d are preferably interconnected by an associated interconnection beam 8b. The interconnection beams 8a, 8b may comprise suitable drive shafts that drivingly interconnect the respective thrust producing units 4a, 4b; 4c, 4d. Alternatively, each one of the respective thrust producing units 4a, 4b, 4c, 4d may be driven by a respectively attributed electrical engine.

Figure 3:
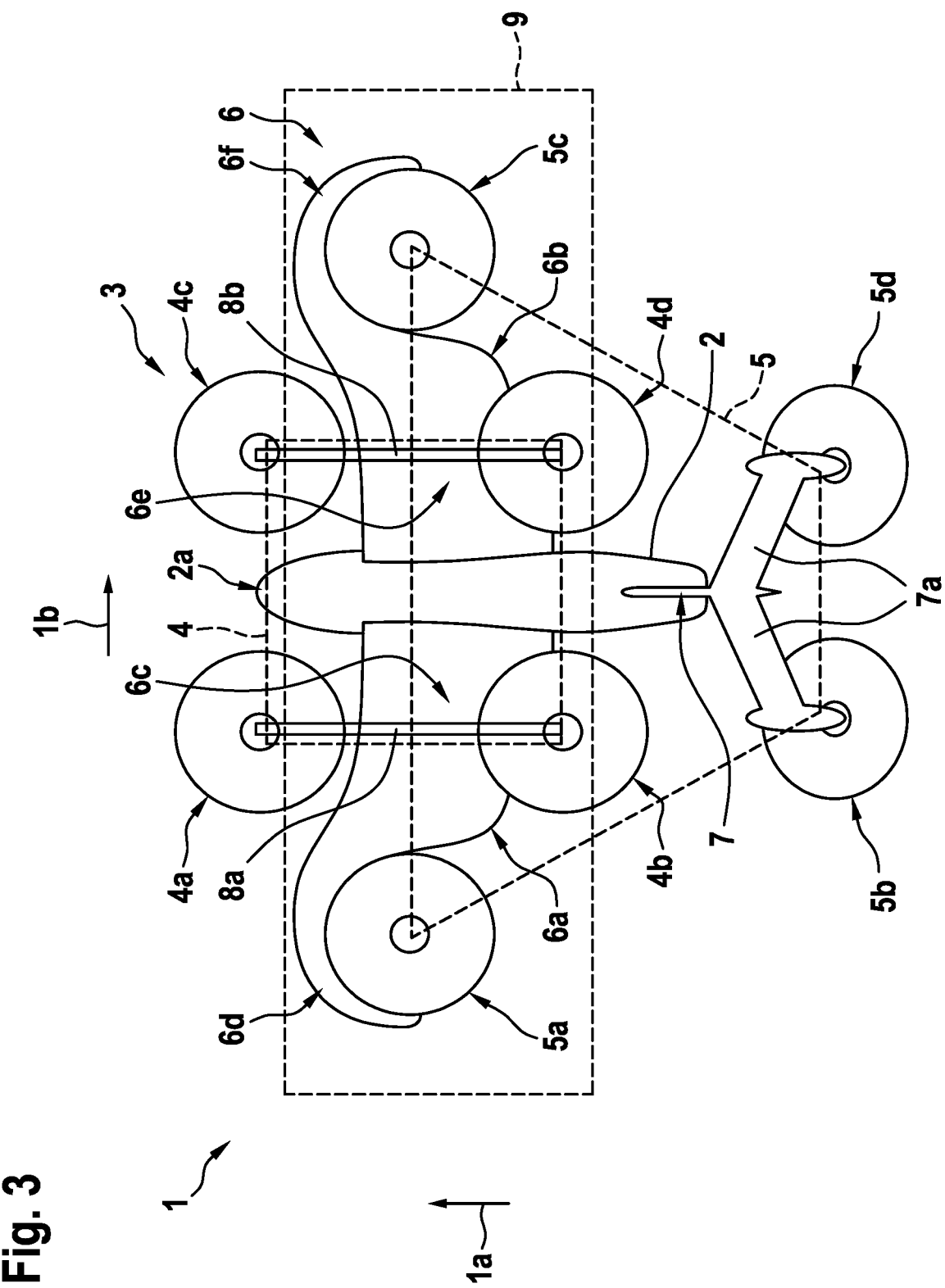
FIG. 3 shows a top view of the VTOL multirotor aircraft of FIG. 2, with the plurality of thrust producing units and the wing.

FIG. 3 shows the VTOL multirotor aircraft 1 of FIG. 2 with the plurality of thrust producing units 3 that comprises the first and second thrust producing units sub-assemblies 4, 5, the wing 6, and the rear stabilizer 7. Similar to FIG. 1 and FIG. 2, the VTOL multirotor aircraft 1 is illustrated in an operation mode that corresponds to vertical taking-off and landing.

According to one aspect, the thrust producing units 4b, 4d of the first thrust producing units sub-assembly 4 and the thrust producing units 5a, 5c of the second thrust producing units sub-assembly 5 are arranged in an intersection zone 9 of the first and second thrust producing units sub-assemblies 4, 5. The thrust producing units 4b, 4d, 5a, 5c in the intersection zone 9 are preferentially non-tiltably connected to the fuselage 2 for generating lift at least during vertical taking-off and landing.

Preferably, at least 25% of the eight thrust producing units 4a, 4b, 4c, 4d, 5a, 5b, 5c, 5d are arranged in the intersection zone 9 and, preferentially, in the wing 6. In the illustrated example, four of the eight thrust producing units, i. e. the thrust producing units 4b, 4d, 5a, 5c, are arranged in the intersection zone 9 resp. in the wing 6, i. e. exactly 50% of the eight thrust producing units 4a, 4b, 4c, 4d, 5a, 5b, 5c, 5d.

Illustratively, the intersection zone 9 is provided with the wing 6. The wing 6 in the intersection zone 9 preferably accommodates at least partly each one of the thrust producing units 4b, 4d, 5a, 5c which are arranged in the intersection zone 9.

In an exemplary operation of the VTOL multirotor aircraft 1, the first and second thrust producing units sub-assemblies 4, 5 are operational during vertical taking-off to provide lift. However, a respective thrust balance between the first and second thrust producing units sub-assemblies 4, 5 is preferably controlled such that essentially the first thrust producing units sub-assembly 4 provides the lift. In other words, the lift provided by the second thrust producing units sub-assembly 5 would be significantly smaller than the lift provided by the first thrust producing units sub-assembly 4. In order to switch from vertical taking-off to cruise operation, the respective thrust balance is switched from the first thrust producing units sub-assembly 4 to the second thrust producing units sub-assembly 5. Thus, the VTOL multirotor aircraft 1 can at least initially be controlled in the longitudinal direction 1a due to the (pre-) inclined thrust producing units 5b, 5d of the second thrust producing units sub-assembly 5. More specifically, during low-speed operation of the VTOL multirotor aircraft 1 no additional propulsion for forward flight by the thrust producing units 4a, 4c of the first thrust producing units sub-assembly 4 is required. If, however, transition to high-speed operation is required, an in-flight transformation of the first thrust producing units sub-assembly 4 by means of a respective inclination, i. e. an active tilting of the thrust producing units 4a, 4c is performed.

Alternatively, the first thrust producing units sub-assembly 4 may be operational to provide lift during vertical taking-off, while the second thrust producing units sub-assembly 5 may be in an Off-mode during vertical taking-off. Then, in order to switch from vertical taking-off to cruise operation, the second thrust producing units sub-assembly 5 may be activated such that the thrust producing units 5b, 5d generate forward thrust, while the thrust producing units 5a, 5c of the second thrust producing units sub-assembly 5 may provide sufficient lift in cruise operation. Thus, after having performed a respective in-flight transformation of the VTOL multirotor aircraft 1 from vertical taking-off to cruise operation, the first thrust producing units sub-assembly 4 may e. g. be completely turned off, e. g. if only low-speed cruise operation is required, or alternatively the thrust producing units 4a, 4c of the first thrust producing units sub-assembly 4 may be tilted to generate additional forward thrust such that high-speed cruise operation is enabled. In this case, only the thrust producing units 4b, 4d of the first thrust producing units sub-assembly 4 may be turned off.

Still alternatively, if only low-speed cruise operation is required, the thrust producing units 5b, 5d of the second thrust producing units sub-assembly 5 may remain in Off-mode, and only the thrust producing units 5a, 5c are turned on during the in-flight transformation so that the thrust producing units 4b, 4d, 5a, 5c provide sufficient lift for the VTOL multirotor aircraft 1 such that the thrust producing units 4a, 4c may be tilted during the in-flight transformation so as to generate the forward thrust that is required for low-speed cruise operation.

Figure 4:
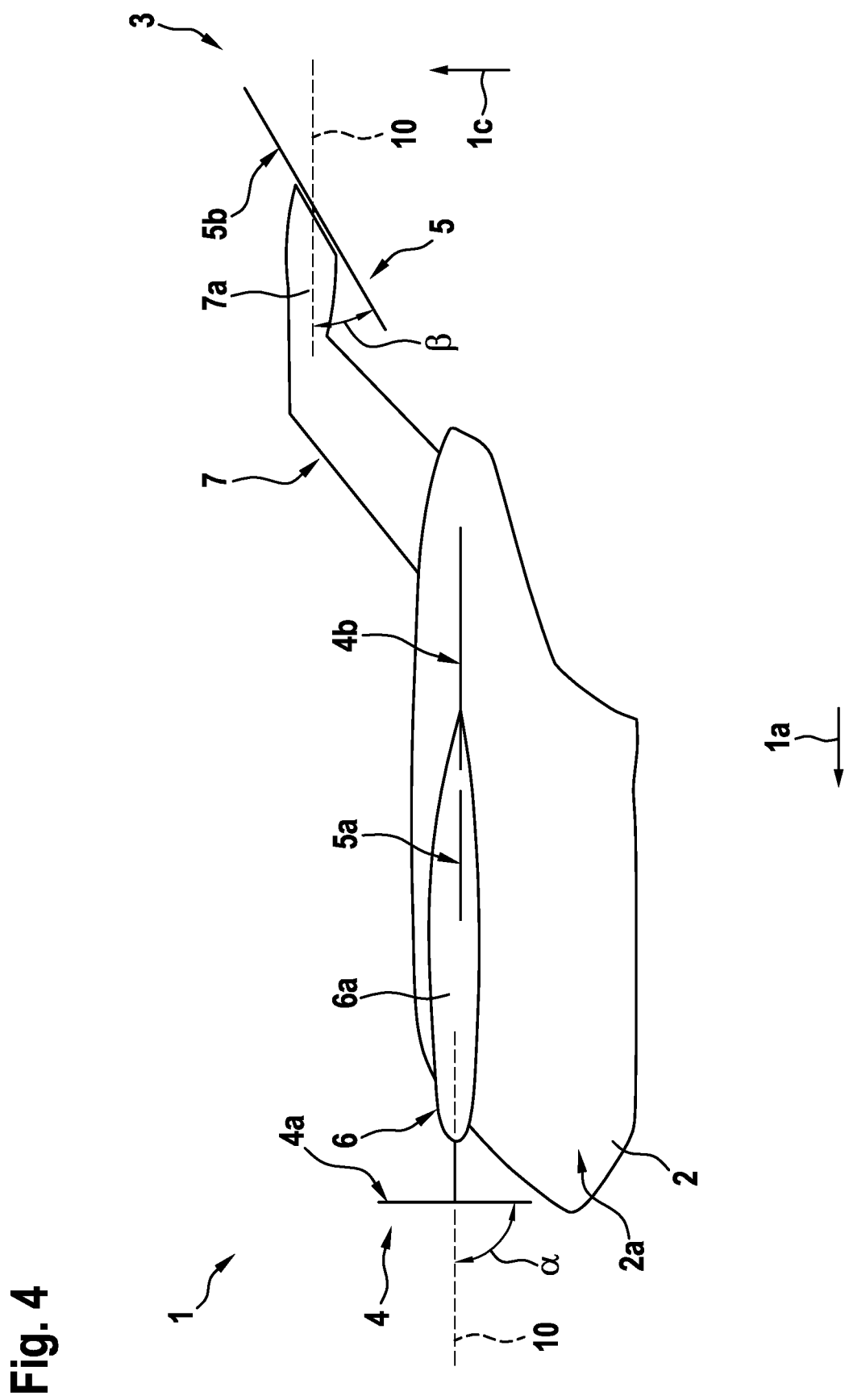
FIG. 4 shows a side view of the VTOL multirotor aircraft of FIG. 1, with the plurality of thrust producing units and the wing, during cruise operation.

FIG. 4 shows the VTOL multirotor aircraft 1 of FIG. 1 to FIG. 3, which is now by way of example illustrated in an exemplary cruise operation. In correspondence to FIG. 1 to FIG. 3, the VTOL multirotor aircraft 1 comprises the fuselage 2, the plurality of thrust producing units 3 that comprises the first thrust producing units sub-assembly 4 and the second thrust producing units sub-assembly 5, the wing 6 and the rear stabilizer 7.

As described above with reference to FIG. 3, during cruise operation the thrust producing unit 4a (and the thrust producing unit 4c of FIG. 2 and FIG. 3) may be tilted by an associated inclination angle α with respect to the fuselage 2, i. e. with respect to a reference direction, such as horizontal direction 10. The horizontal direction 10 illustratively corresponds, i. e. is parallel, to the longitudinal direction 1a of the VTOL multirotor aircraft 1.

The associated inclination angle α preferably ranges in an interval from −90° to 0°, and illustratively amounts to −90°. Preferably, at least during high-speed cruise operation the associated inclination angle α amounts to −90°.

According to one aspect, the thrust producing unit 4a (and the thrust producing unit 4c of FIG. 2 and FIG. 3) of the first thrust producing units sub-assembly 4 may already be tilted during low-speed cruise operation, but is (are) preferably at least tilted during high-speed cruise operation for generating additional forward thrust, as described in more detail below with reference to FIG. 5.

FIG. 4 further illustrates an exemplary predetermined inclination angle β of the thrust producing unit 5b (and the thrust producing unit 5d of FIG. 2 and FIG. 3) of the second thrust producing units sub-assembly 5 with respect to the horizontal direction 10. Preferably, the predetermined inclination angle β ranges from −25° to −45°, and illustratively amounts to −30°.

Figure 5:
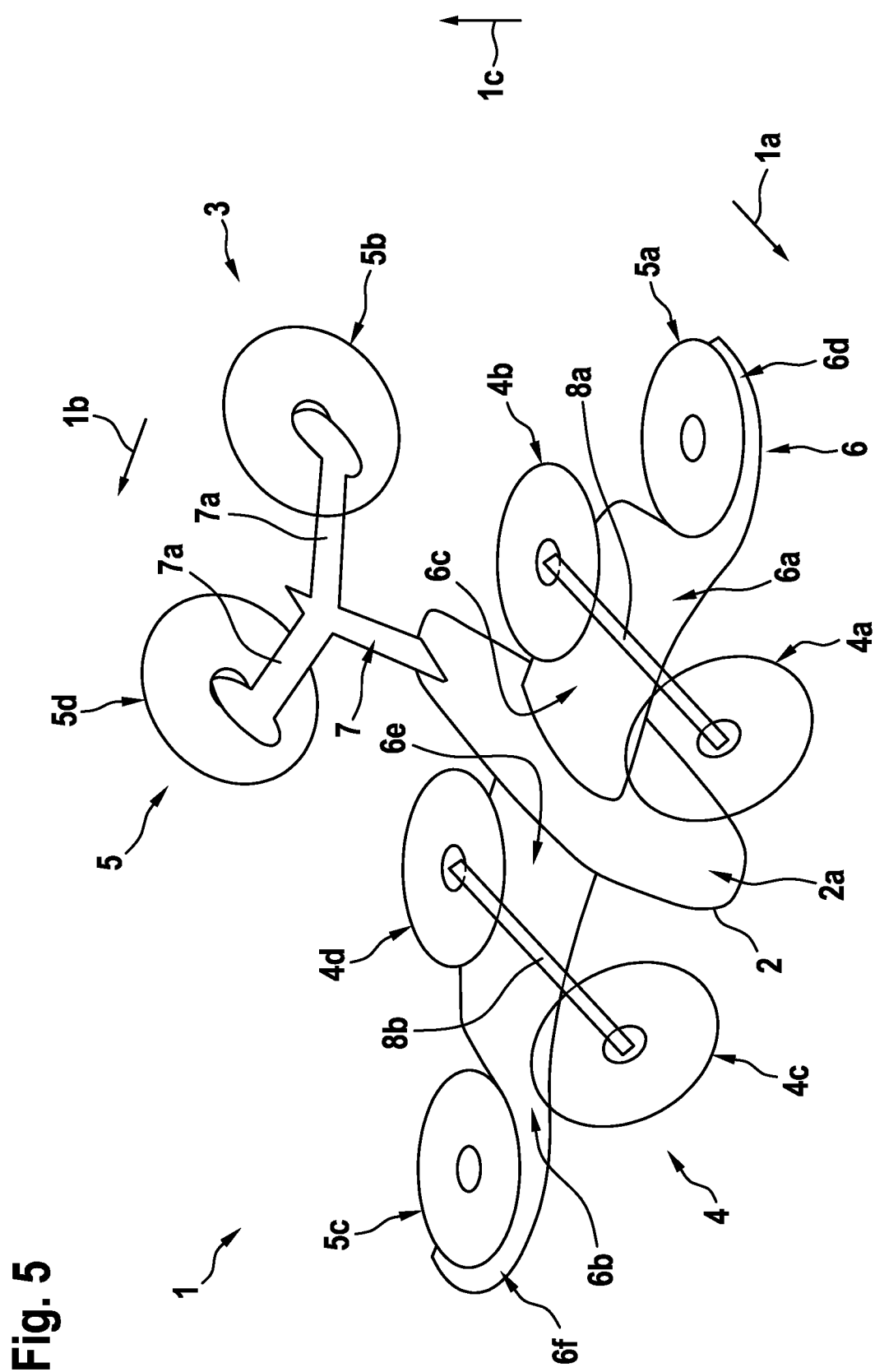
FIG. 5 shows a perspective view of the VTOL multirotor aircraft of FIG. 4, with the plurality of thrust producing units and the wing.

FIG. 5 shows the VTOL multirotor aircraft 1 of FIG. 4 with the fuselage 2, the plurality of thrust producing units 3 that comprises the first and second thrust producing units sub-assemblies 4, 5, the wing 6 and the rear stabilizer 7. In accordance with FIG. 4, the VTOL multirotor aircraft 1 is again shown during cruise operation.

As explained above with reference to FIG. 4, in cruise operation and, more specifically, at least during high-speed cruise operation, the thrust producing unit 4a is inclined by the predetermined inclination angle α of FIG. 4, which in FIG. 4 and FIG. 5 illustratively amounts to −90°. Likewise, the thrust producing unit 4c of the first thrust producing units sub-assembly 4 is similarly inclined by the predetermined inclination angle α of FIG. 4. Thus, the thrust producing unit 4c is illustratively also inclined by an angle of −90°.

Figure 6:
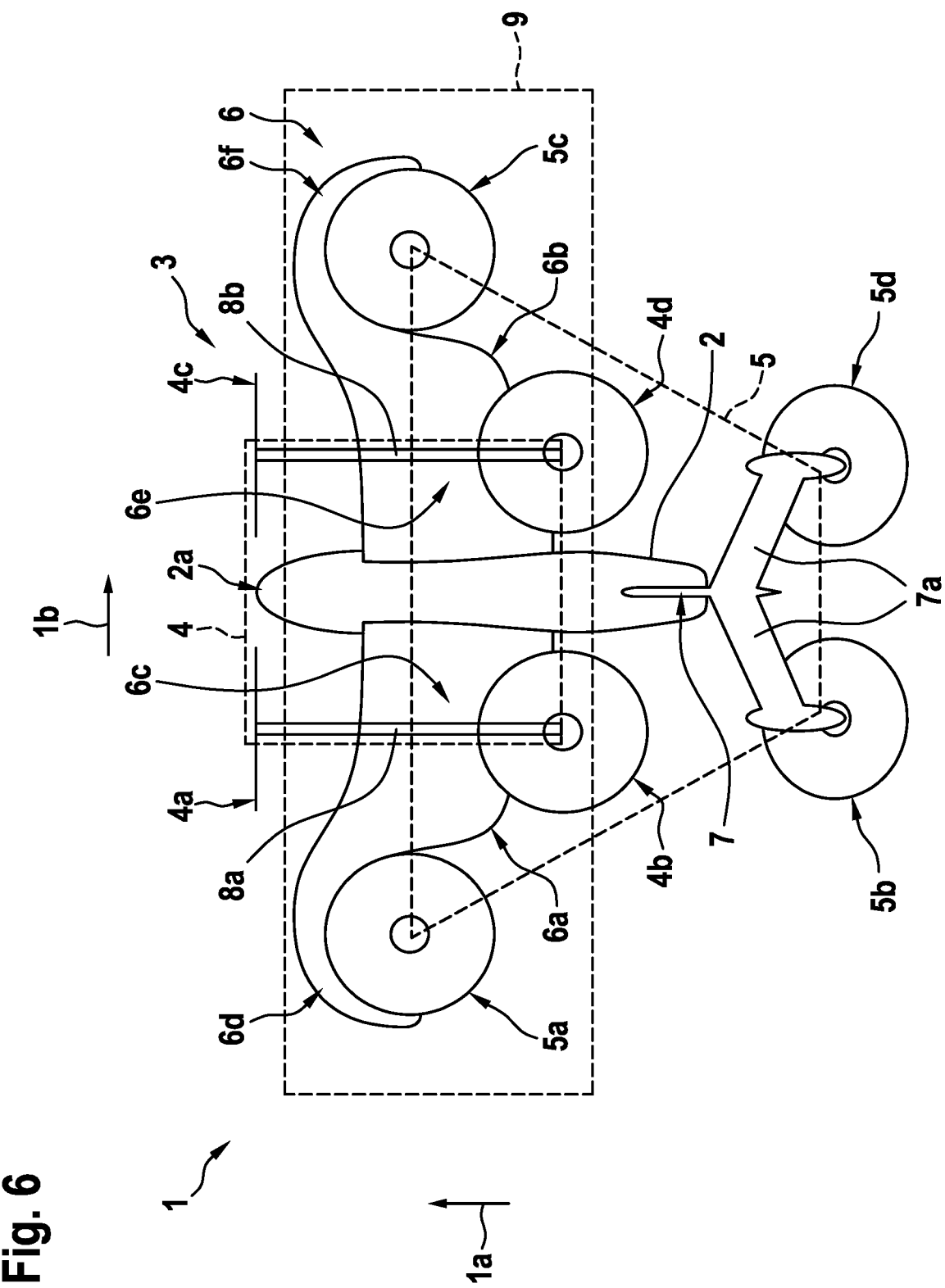
FIG. 6 shows a top view of the VTOL multirotor aircraft of FIG. 5, with the plurality of thrust producing units and the wing.

FIG. 6 shows the VTOL multirotor aircraft 1 of FIG. 4 and FIG. 5 during cruise operation, with the fuselage 2, the plurality of thrust producing units 3 that comprises the first and second thrust producing units sub-assemblies 4, 5, the wing 6 and the rear stabilizer 7. FIG. 6 further illustrates constitution of the first thrust producing units sub-assembly 4 that comprises the thrust producing units 4a, 4b, 4c, 4d, as well as of the second thrust producing units sub-assembly 5 that comprises the thrust producing units 5a, 5b, 5c, 5d.

Moreover, FIG. 6 further illustrates inclination of the tiltable thrust producing units 4a, 4c of the first thrust producing units sub-assembly 4, as well as of the thrust producing units 5b, 5d of the second thrust producing units sub-assembly 5, which are pre-inclined but non-tiltably arranged at the support structure 7a of the rear stabilizer 7. Finally, FIG. 6 again illustrates the intersection zone 9, wherein illustratively the wing 6 and the thrust producing units 4b, 4d of the first thrust producing units sub-assembly 4 and the thrust producing units 5a, 5c of the second thrust producing units sub-assembly 5 are arranged.

Figure 7:
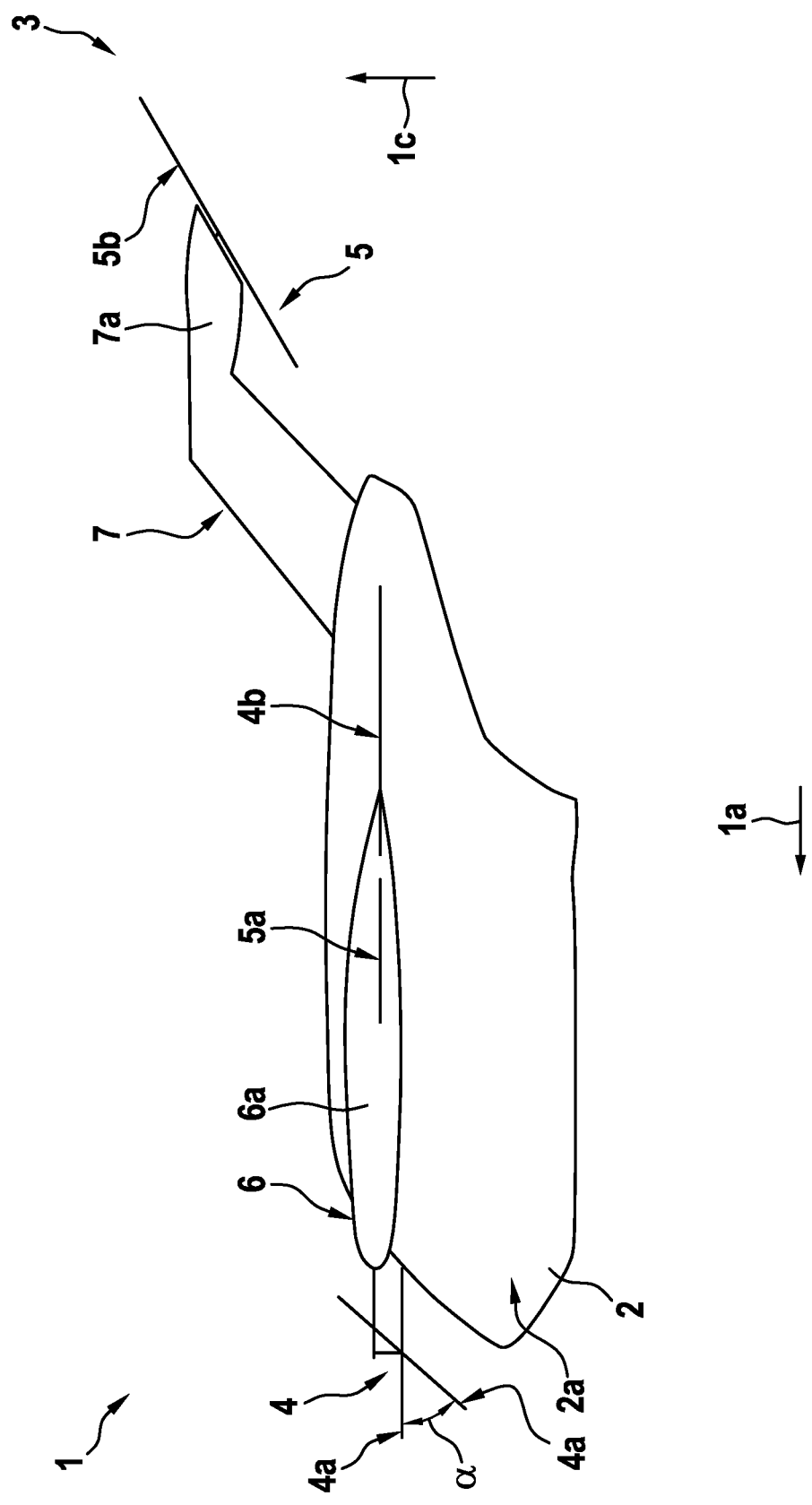
FIG. 7 shows a side view of the VTOL multirotor aircraft of FIG. 1 and FIG. 4, with the plurality of thrust producing units and the wing, during in-flight transformation.

FIG. 7 shows the VTOL multirotor aircraft 1 in the configuration according to FIG. 1 during an in-flight transformation into the configuration according to FIG. 4, i. e. an in-flight transformation from a respectively exemplary taking-off and landing configuration according to FIG. 1 into a respective cruise operation configuration according to FIG. 4. As explained above with reference to FIG. 3, the in-flight transformation is performed by a suitable control of the first and second thrust producing units sub-assemblies 4, 5 of the VTOL multirotor aircraft 1 (cp. FIG. 3). One of the elements of the in-flight transformation consists, as explained above with respect to FIG. 4, in tilting of the thrust producing unit 4a (and the thrust producing unit 4c of FIG. 2, FIG. 3, FIG. 5, FIG. 6) of the first thrust producing units sub-assembly 4 by the predetermined inclination angle α of FIG. 4.

Figure 8:
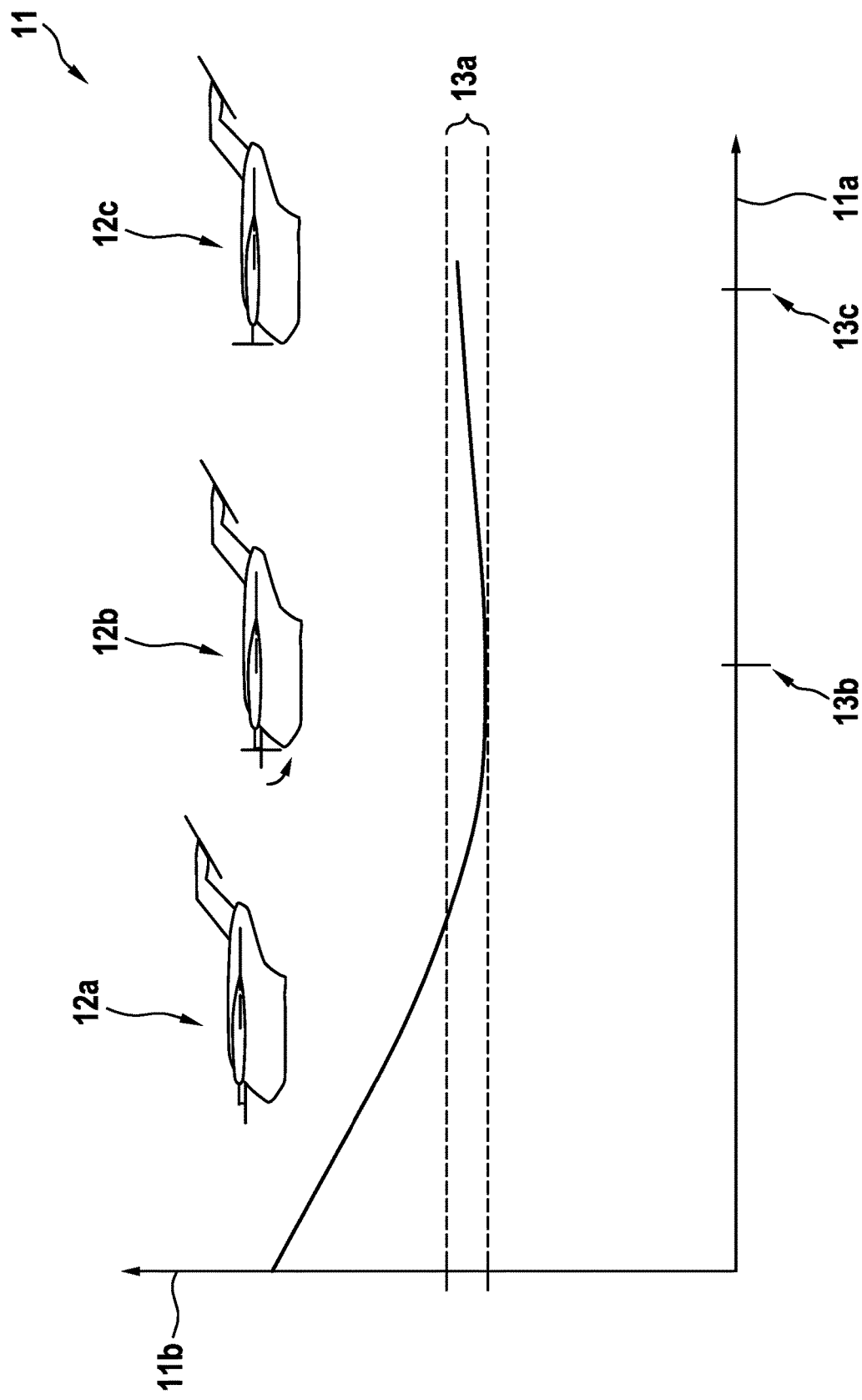
FIG. 8 shows a power-velocity-diagram for the VTOL multirotor aircraft of FIG. 7.

FIG. 8 shows an exemplary power-velocity-diagram 11 having an axis of abscissa 11a that represents the velocity and an axis of ordinate 11b that represents a respectively required power of the VTOL multirotor aircraft 1 of FIG. 1 to FIG. 7. By way of example, the power-velocity-diagram 11 illustrates a respective power that is required to obtain a desired velocity in three exemplary flight phases 12a, 12b, 12c.

The flight phase 12a represents an exemplary taking-off or landing of the VTOL multirotor aircraft 1 according to FIG. 1 to FIG. 3. The flight phase 12b represents an exemplary in-flight transformation of the VTOL multirotor aircraft 1 according to FIG. 7, i. e. the in-flight transformation from the taking-off and landing configuration according to FIG. 1 to FIG. 3 into an exemplary cruise operation configuration according to FIG. 4 to FIG. 6. The flight phase 12c exemplarily illustrates cruise operation of the VTOL multirotor aircraft 1 according to FIG. 4 to FIG. 6.

By way of example, a range 13a is indicated, which illustrates a preferred resp. optimum cruise power range. In order not to descend below the optimum cruise power range 13a, in-flight transformation of the VTOL multirotor aircraft 1 is required. By way of example, the in-flight transformation is performed as described above with respect to FIG. 7 by means of the first thrust producing units sub-assembly 4 of the preceding figures starting at a first thrust producing system transformation range 13b.

Illustratively, the in-flight transformation of the VTOL multirotor aircraft 1 is finished at a point 13c, which illustrates a preferred resp. optimum cruise velocity of the VTOL multirotor aircraft 1.

It should be noted that modifications of the above described aspects of the present invention are also within the common knowledge of the person skilled in the art and, thus, also considered as being part of the present invention. An example for such modifications is hereinafter described with reference to FIG. 9 and FIG. 10.

Figure 9:
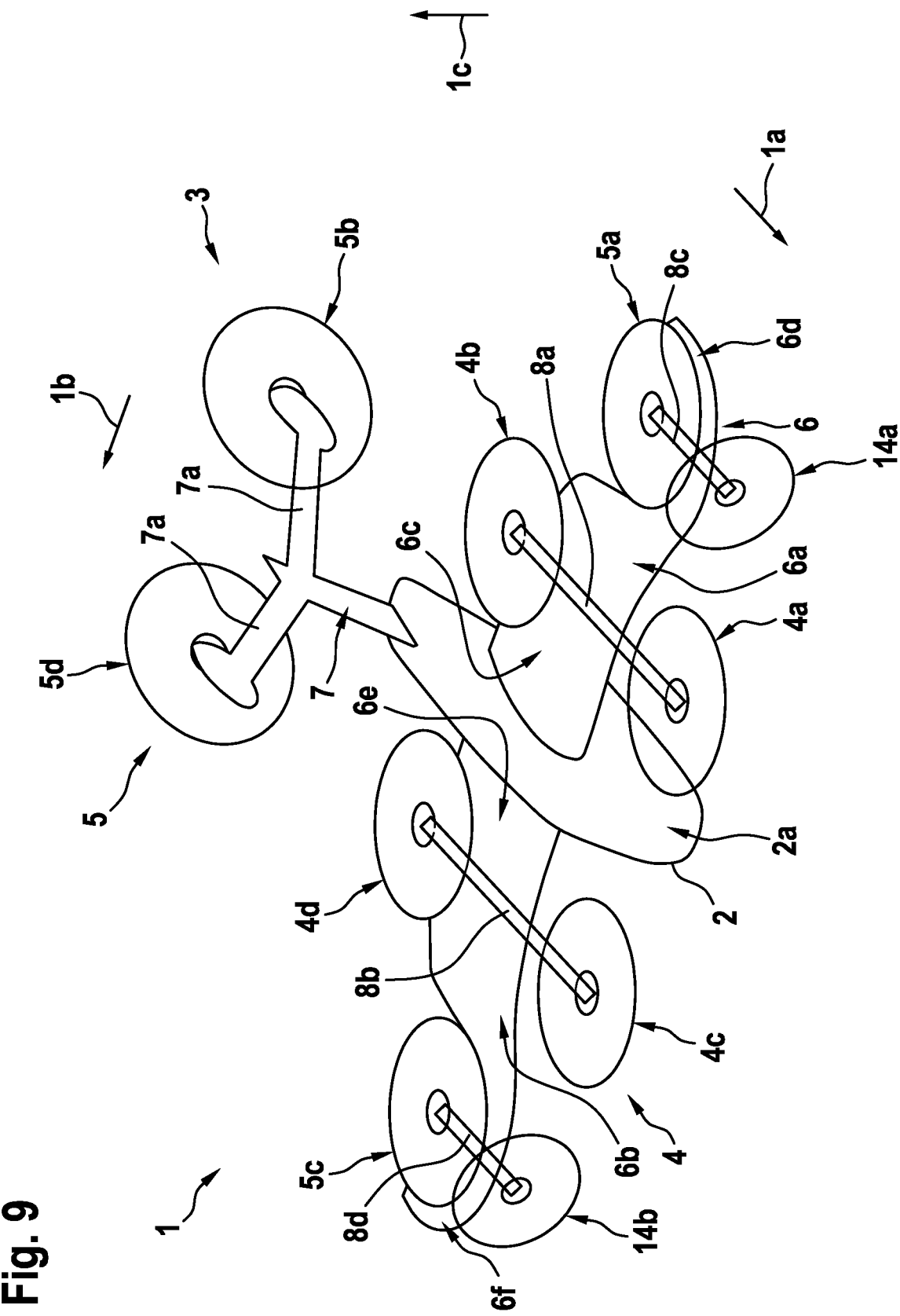
FIG. 9 shows a perspective view of the VTOL multirotor aircraft of FIG. 1, with the plurality of thrust producing units, the wing, and additional thrust producing units, during vertical taking-off and landing.

FIG. 9 shows the VTOL multirotor aircraft 1 of FIG. 1 to FIG. 3, which is illustratively in the exemplary taking-off and landing configuration according to FIG. 1 to FIG. 3. The VTOL multirotor aircraft 1 comprises the fuselage 2, the plurality of thrust producing units 3 that comprises the first and second thrust producing units sub-assemblies 4, 5, the wing 6 and the rear stabilizer 7 according to the above-described FIG. 1 to FIG. 3. However, in contrast thereto, the VTOL multirotor aircraft 1 now comprises two additional thrust producing units 14a, 14b. The additional thrust producing units 14a, 14b are exemplarily inclined by approximately −90° with respect to the longitudinal direction 1a, i. e. the horizontal direction 10 of FIG. 4. Preferably, the additional thrust producing units 14a, 14b are non-tiltably connected to the fuselage 2 for generating additional forward thrust at least during high-speed cruise operation.

According to one aspect, the additional thrust producing units 14a, 14b are respectively connected by means of associated interconnection beams 8c, 8d to the thrust producing units 5a, 5c of the second thrust producing units sub-assembly 5. As explained above with reference to the interconnection beams 8a, 8b in FIG. 2, the interconnection beams 8c, 8d may comprise respective drive shafts that drivingly interconnect the corresponding thrust producing units 14a, 5a as well as 14b, 5c. Accordingly, the additional thrust producing units 14a, 14b preferably form part of the second thrust producing units sub-assembly 5. However, each one of the thrust producing units 14a, 5a as well as 14b, 5c may also be driven individually, e. g. by means of one or more associated electrical engines.

It should be noted that the additional thrust producing units 14a, 14b are exemplarily arranged in the longitudinal direction 1a of the VTOL multirotor aircraft 1 upstream of the wing 6. Thus, in the example of FIG. 9 the four thrust producing units 4a, 4c, 14a, 14b of the ten thrust producing units 4a, 4b, 4c, 4d, 5a, 5b, 5c, 5d, 14a, 14b are arranged in the longitudinal direction 1a upstream of the wing 6, i. e. exactly 40% of the ten thrust producing units 4a, 4b, 4c, 4d, 5a, 5b, 5c, 5d, 14a, 14b.

Figure 10:
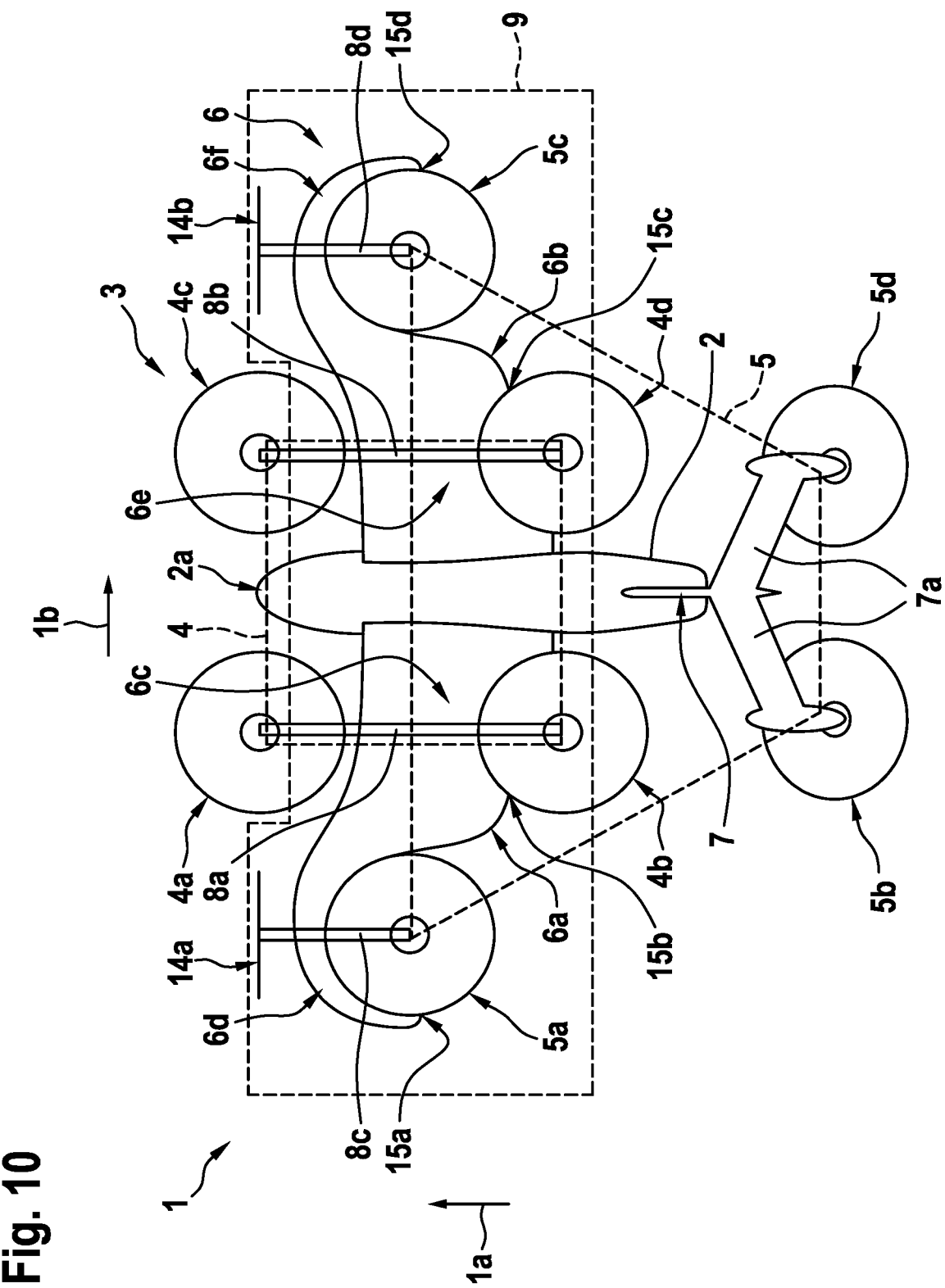
FIG. 10 shows a top view of the VTOL multirotor aircraft of FIG. 9, with the plurality of thrust producing units, the wing, and the additional thrust producing units.

FIG. 10 shows the VTOL multirotor aircraft 1 of FIG. 9 with the fuselage 2, the plurality of thrust producing units 3 that comprises the first and second thrust producing units sub-assemblies 4, 5, the wing 6 and the rear stabilizer 7. FIG. 10 further illustrates the arrangement of the thrust producing units 4b, 4d, 5a, 5c in the interconnection zone 9, as described above with reference to FIG. 3. However, FIG. 10 further illustrates arrangement of the additional thrust producing units 14a, 14b of FIG. 9 in the intersection zone 9 as well.

As described above with reference to FIG. 1 to FIG. 7 as well as FIG. 9 and FIG. 10, the intersection zone 9 illustratively comprises the wing 6. However, it should be noted that use of the wing 6 is merely described by way of example and not for limiting the present application accordingly. Instead, e. g. a blown-wing, one or more partial shroudings and/or full shroudings may likewise be used with the VTOL multirotor aircraft 1.

In the illustrative configuration with the wing 6, preferably a partial shrouding 15a, 15b, 15c, 15d is provided for each one of the thrust producing units which are accommodated in the wing 6. Thus, aerodynamic drag can be reduced significantly.

Illustratively, the partial shrouding 15a is provided for the thrust producing unit 5a, the partial shrouding 15b is provided for the thrust producing unit 4b, the partial shrouding 15c is provided for the thrust producing unit 4d, and the partial shrouding 15d is provided for the thrust producing unit 5c. This likewise applies to all configurations of the VTOL multirotor aircraft 1 described above with reference to FIG. 1 to FIG. 7 as well as FIG. 9. Nevertheless, it should be noted that the partial shroudings 15a, 15b, 15c, 15d are also only described by way of example and not for limiting the present invention accordingly, as e. g. one or more of the partial shroudings 15a, 15b, 15c, 15d may e. g. be replaced by full shroudings.

It should be noted that suitable partial shroudings that may be used to implement the partial shroudings 15a, 15b, 15c, 15d, as well as suitable full shroudings that may be used to implement respective full shroudings, are well-known by the person skilled in the art and are not the object of the present invention as such. By way of example, respective shroudings are described in co-pending European patent applications EP 17400008.3 and EP 18400003.2. It should be noted that the content of these two co-pending European patent applications is considered as being entirely incorporated by reference and, as such, as forming entirely part of the present description, so that a more detailed description of respective shroudings can be omitted for brevity and conciseness.

Furthermore, it should be noted that the partial shroudings 15a, 15b, 15c, 15d and/or respective full shroudings are preferably configured with longitudinally directed carrier beams, such as e. g. described in the co-pending European patent application 18400014.9. Again, the content of this European patent application is considered as being entirely incorporated by reference and, as such, as forming entirely part of the present description, so that a more detailed description of such longitudinally oriented carrier beams can be omitted for brevity and conciseness.

Finally, it should be noted that with respect to FIG. 1 to FIG. 7, exactly eight thrust producing units are illustrated. Subsequently, with respect to FIG. 9 and FIG. 10, ten thrust producing units are illustrated. Thus, it should be clear that the inventive VTOL multirotor aircraft 1 preferably comprises at least eight thrust producing units, but may be provided with more than eight thrust producing units depending on an intended e. g. application-specific implementation. Accordingly, each one of the first and second thrust producing units sub-assemblies 4, 5 comprises at least four thrust producing units, but may comprise more than the four thrust producing units as illustrated in FIG. 9 and FIG. 10. Furthermore, preferably at least two thrust producing units of each one of the first and second thrust producing units sub-assemblies 4, 5 are arranged in the intersection zone 9, preferably at least two thrust producing units of the first thrust producing units sub-assembly 4 are arranged upstream of the wing 6, at least two thrust producing units of the second thrust producing units sub-assembly 5 are inclined fixedly by the predetermined inclination angle (3, and at least two thrust producing units of the first thrust producing units sub-assembly 4 are tiltably connected to the airframe.

REFERENCE LIST

1 Vertical take-off and landing multirotor aircraft
1a Aircraft longitudinal resp. length direction and forward flight direction
1b Aircraft lateral resp. width direction
1c Aircraft vertical resp. height direction and vertical take-off direction
2 Aircraft airframe
2a Aircraft airframe internal volume
3 Thrust producing units
4 First thrust producing units sub-assembly
4a, 4b, 4c, 4d Thrust producing units of first thrust producing units sub-assembly
5 Second thrust producing units sub-assembly
5a, 5b, 5c, 5d Thrust producing units of second thrust producing units sub-assembly
6 Wing
6a Star board side half wing
6b Board side half wing
6c Star board side half wing inboard section
6d Star board side half wing outboard section
6e Board side half wing inboard section
6f Board side half wing outboard section
7 Rear stabilizer
7a Thrust producing unit support structure
8a, 8b, 8c, 8d Thrust producing unit interconnection beams
9 Intersection zone
10 Horizontal orientation
11 Power-velocity-diagram
11a Axis of abscissa representing velocity
11b Axis of ordinate representing power
12a, 12b, 12c Flight phases
13a Optimum cruise power range
13b First thrust producing system transformation range
13c Optimum cruise velocity
14a, 14b Additional thrust producing units 15a, 15b, 15c, 15d Partial shroudings
α, β Thrust producing units inclination angles

What is claimed is:

1. A vertical take-off and landing multirotor aircraft with an airframe and at least eight thrust producing units, each one of the at least eight thrust producing units being provided for producing thrust in an associated predetermined thrust direction,
wherein at least four thrust producing units of the at least eight thrust producing units form a first thrust producing units sub-assembly, and at least four other thrust producing units of the at least eight thrust producing units form a second thrust producing units sub-assembly, the first thrust producing units sub-assembly being operable independent of the second thrust producing units sub-assembly,
wherein at least two thrust producing units of the first thrust producing units sub-assembly and at least two thrust producing units of the second thrust producing units sub-assembly are arranged in an intersection zone of the first and second thrust producing units sub-assemblies and are non-tiltably connected to the airframe for generating lift at least during vertical take-off and landing, and the at least two thrust producing units of the first thrust producing units sub-assembly are arranged rearward of the at least two thrust producing units of the second thrust producing units sub-assembly with respect to a longitudinal direction of the aircraft,
wherein at least two other thrust producing units of the second thrust producing units sub-assembly are arranged rearward of the intersection zone with respect to the longitudinal direction of the aircraft and are inclined by a predetermined inclination angle (13) with respect to the longitudinal direction of the aircraft and are non-tiltably connected to the airframe for generating forward thrust at least during low-speed cruise operation, and
wherein at least two thrust producing units of the first thrust producing units sub-assembly are arranged forward of the intersection zone with respect to the longitudinal direction of the aircraft and are tiltably connected to the airframe for generating additional forward thrust at least during high-speed cruise operation.

2. The vertical take-off and landing multirotor aircraft of claim 1, wherein low-speed cruise operation comprises operation at a velocity of 0.3*Vh to less than 0.7*Vh, wherein high-speed cruise operation comprises operation at a velocity of at least 0.7*Vh, and wherein Vh is a predefined cruise speed of the aircraft.

3. The vertical take-off and landing multirotor aircraft of claim 1, wherein the at least two thrust producing units of the first thrust producing units sub-assembly which are tiltably connected to the airframe for generating additional forward thrust at least during high-speed cruise operation are tilted during low-speed cruise operation.

4. The vertical take-off and landing multirotor aircraft of claim 1, wherein the at least two thrust producing units of the first thrust producing units sub-assembly which are tiltably connected to the airframe for generating additional forward thrust at least during high-speed cruise operation are tiltable with respect to the longitudinal direction of the aircraft by an associated inclination angle in a range from −90° to 0°.

5. The vertical take-off and landing multirotor aircraft of claim 1, wherein the intersection zone is provided with at least one of a wing, a blown-wing, one or more partial shroudings, or full shroudings.

6. The vertical take-off and landing multirotor aircraft of claim 1, wherein the intersection zone comprises a wing that accommodates at least partly each one of the at least two thrust producing units of the first thrust producing units sub-assembly which are arranged in the intersection zone and/or each one of the at least two thrust producing units of the second thrust producing units sub-assembly which are arranged in the intersection zone.

7. The vertical take-off and landing multirotor aircraft of claim 6, wherein a partial shrouding is provided for each one of the at least two thrust producing units of the first thrust producing units sub-assembly which are accommodated in the wing and/or each one of the at least two thrust producing units of the second thrust producing units sub-assembly which are accommodated in the wing.

8. The vertical take-off and landing multirotor aircraft of claim 6, wherein the at least two thrust producing units of the first thrust producing units sub-assembly which are tiltably connected to the airframe for generating additional forward thrust at least during high-speed cruise operation are arranged in the longitudinal direction of the aircraft upstream of the wing.

9. The vertical take-off and landing multirotor aircraft of claim 6, wherein at least 25% of the at least eight thrust producing units are arranged in the longitudinal direction of the aircraft upstream of the wing.

10. The vertical take-off and landing multirotor aircraft of claim 1, wherein the predetermined inclination angle (β) is in a range from −25° to −45°.

11. The vertical take-off and landing multirotor aircraft of claim 1, wherein the at least two thrust producing units of the second thrust producing units sub-assembly which are inclined by the predetermined inclination angle with respect to the longitudinal direction of the aircraft and which are non-tiltably connected to the airframe for generating forward thrust at least during low-speed cruise operation are mounted to a rear stabilizer.

12. The vertical take-off and landing multirotor aircraft of claim 1, wherein at least two additional thrust producing units are provided, the at least two additional thrust producing units being inclined by at least approximately −90° with respect to the longitudinal direction of the aircraft and being non-tiltably connected to the airframe for generating additional forward thrust at least during high-speed cruise operation.

13. The vertical take-off and landing multirotor aircraft of claim 1, wherein the first thrust producing units sub-assembly is dedicated to control of vertical take-off and landing, and wherein the second thrust producing units sub-assembly is dedicated to control of low-speed cruise operation.

14. The vertical take-off and landing multirotor aircraft of claim 1, wherein at least 50% of the at least eight thrust producing units are electrically driven.

15. The vertical take-off and landing multirotor aircraft of claim 1, wherein the airframe is adapted for transportation of passengers.

* * * * *